United States Patent [19]

Mauck

[11] Patent Number: 5,357,694
[45] Date of Patent: Oct. 25, 1994

[54] HEEL PROTECTOR

[76] Inventor: K. Joan Mauck, 4080 Normandy Dr., Lee's Summit, Mo. 64082

[21] Appl. No.: 17,761

[22] Filed: Feb. 16, 1993

Related U.S. Application Data

[63] Continuation-in-part of Ser. No. 799,714, Nov. 26, 1991, abandoned, which is a continuation of Ser. No. 407,199, Sep. 14, 1989, abandoned.

[51] Int. Cl.$^5$ .............................................. A43B 23/30
[52] U.S. Cl. ................................... 36/72 B; 36/72 R
[58] Field of Search .................... 36/72 B, 72 R, 7.1 R

[56] References Cited

U.S. PATENT DOCUMENTS

| | | | |
|---|---|---|---|
| 1,531,493 | 3/1925 | Maxon | 36/72 B |
| 1,828,246 | 10/1931 | Destro | 36/72 B |
| 1,916,815 | 7/1933 | Smith | 36/72 B |
| 1,945,420 | 1/1934 | Charles | 36/72 B |
| 2,988,830 | 6/1961 | Zacks | 36/72 B |
| 3,063,172 | 11/1962 | Beattie | 36/72 B |
| 3,187,446 | 6/1965 | Boldemann | 36/72 B X |
| 3,217,430 | 11/1965 | Novick | 36/72 B X |
| 3,239,953 | 3/1966 | Norton | 36/72 B |
| 4,756,097 | 7/1988 | Sanders | 36/72 B |
| 5,044,097 | 9/1991 | Young | 36/72 B |

FOREIGN PATENT DOCUMENTS

| | | | |
|---|---|---|---|
| 3426293 | 1/1986 | Fed. Rep. of Germany | 36/72 B |
| 2171588 | 9/1986 | United Kingdom | 36/72 B |
| 2225702 | 6/1990 | United Kingdom | 36/72 B |

*Primary Examiner*—Paul T. Sewell
*Assistant Examiner*—Ted Kavanaugh
*Attorney, Agent, or Firm*—Gregory W. Osterloth

[57] ABSTRACT

A protector for the heel and back portions of a shoe, to be worn while driving or for decorative purposes, which is formed by material having a high coefficient of friction and the capability of producing an elastic force is disclosed herein. The lower portion of the material is formed into a funnel-shaped tube which grips to the shoe heel, while the middle portion of the material protects the shoe heel and back. The upper portion consists of a relatively wide flap which is used to stretch the protector before the flap is folded down over the back edge of the shoe and pressed against the rear inner wall of the shoe. The protector is thereby secured to the shoe by surface traction. A nylon layer bonded to the non-gripping surface of the protector increases its durability. A method for installing such a protector is also disclosed.

3 Claims, 2 Drawing Sheets

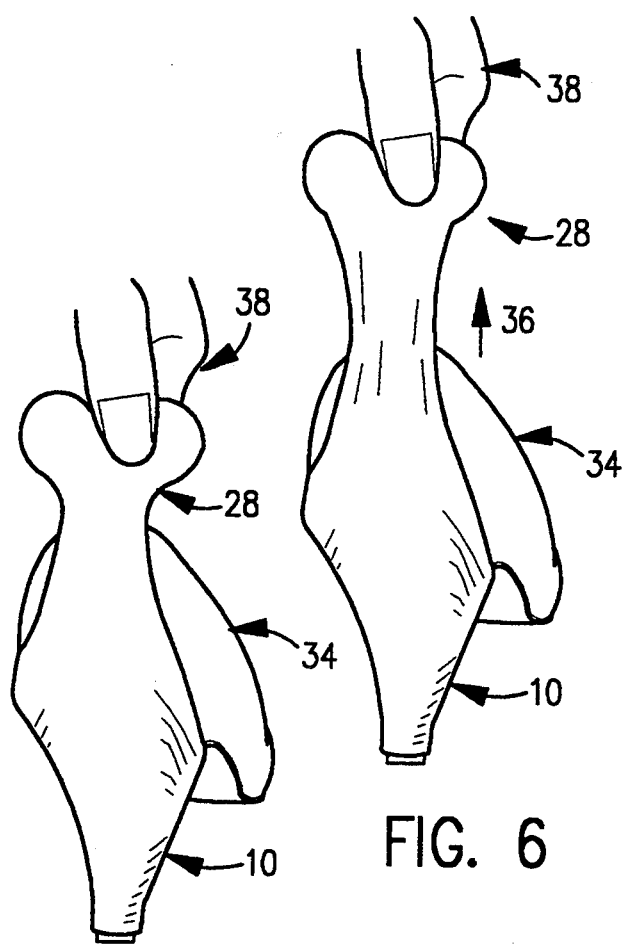
FIG. 5
FIG. 6
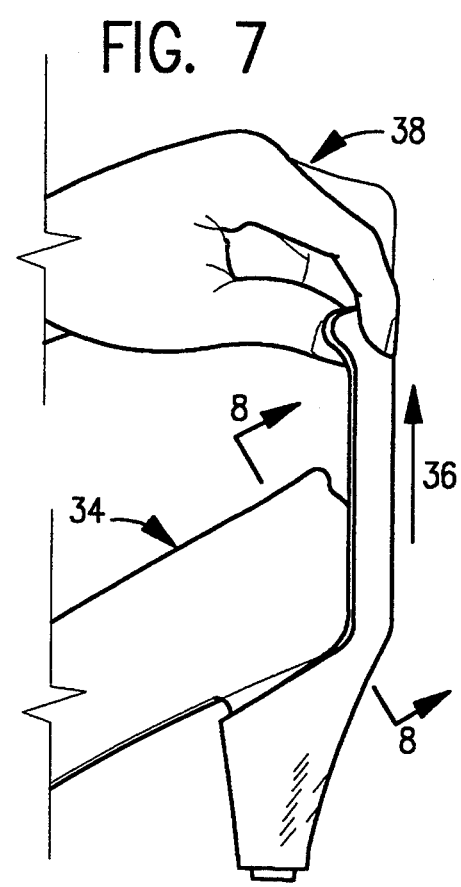
FIG. 7
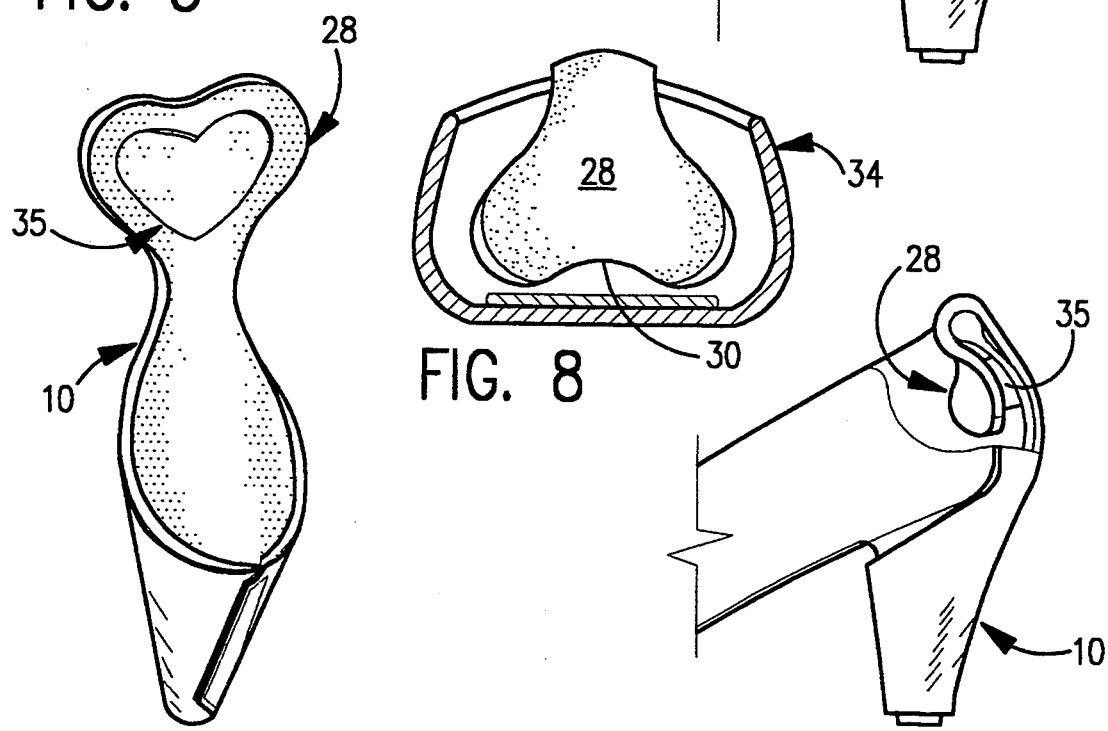
FIG. 8
FIG. 9
FIG. 10

HEEL PROTECTOR

CROSS REFERENCES TO OTHER APPLICATIONS

This is a continuation-in-part of application Ser. No. 07/799,714 filed Nov. 26, 1991 which was a continuation of application Ser. No. 07/407,199 filed Sep. 14, 1989 both now abandoned.

BACKGROUND OF THE INVENTION

This invention pertains to shoe heel protectors, and more particularly, to a device to cover the heel and back portions of a shoe to protect them from becoming scuffed when worn while driving, operating office machines, or doing any other activity which could expose a shoe to the likelihood of damage.

The heel and back of a shoe used by a driver to depress the accelerator pedal of an automobile are highly susceptible to damage or marring from sand or grit on the floor mat or carpet. Other activities are also apt to expose a shoe to similar degradation. This problem is especially pronounced for ladies shoes having relatively high heels. Shoes of this type have a substantially long area of polished surface and the shoe shape dictates that much of the heel and back portions of the shoe rest on the floor when the wearer is seated and operating an automobile accelerator, office machine, or other foot operated device.

This invention also pertains to women's accessories in that the invented heel protector may be used in a purely decorative manner.

Many attempts have heretofore been made to protect against the scarring of shoe heels and backs. A wide variety of protective covers for the heel portions of shoes have been suggested. Many of these comprise covers having shapes intended to more or less conform to the contour of the rear portion of a shoe and the covers are fastened to the shoe with any of a variety of hooks, snaps, buttons, laces, glues or other type fasteners.

Several major drawbacks have been encountered with the previously suggested heel protectors. First, many have been rather difficult to install on a shoe, at least in a manner suitable for insuring that the protector does not inadvertently become dislodged while being worn. Prior protectors of this type often utilized laces, buttons, snaps or hooks which were not easily fastened or removed. Many protectors also required that a user's foot be immediately inserted into their shoe so as to prevent the protector from becoming dislodged. Additionally, the fastening devices of this type could be uncomfortable to the wearer, especially if worn for long periods of time.

The irregular contours of the heel portions of most shoes have also figured significantly in the fact that protectors for this portion of the shoe have not been widely accepted. Some inventors of these items have attempted to shape leather, rubber or similar materials to closely conform to the shape of the shoe. These attempts have been largely unsuccessful, not only because of the difficult to fit contour, but also because of the wide variations in shoe styles wherein the contours of the various respective styles vary substantially. It has either been necessary for the wearer to utilize a generally baggy and unsightly protector in an attempt to accommodate all shoe styles and shapes or the wearer must have a separate protector for each different shoe style possessed.

Furthermore, protectors have been cumbersome, being fabricated out of a variety of hard plastics and often comprising numerous bulky fasteners.

Protectors have also been uncomfortable, some requiring that a hard plastic or metal clip or flap be disposed between the rear of a shoe and the user's foot. Others have required that a strap be tied or looped around a user's ankle.

SUMMARY OF THE INVENTION

It is, therefore, a primary object of the present invention to provide a shoe heel protector which overcomes the foregoing drawbacks of previous protectors and provides the wearer with a highly useful article for protecting the heel and rear portions of shoes when the shoes are to be exposed to possibly damaging situations.

In the achievement of the foregoing object, it is a very important object of the present invention to provide a protector which is easily installed and removed, thereby rendering the article convenient and readily accessible to perform its heel protecting function.

Another important object of this invention is to provide a protector made of a single piece of material wherein the shape and composition of the material provide the means by which it is readily and securely attached to the shoe. Thus the protector is easy to manufacture and auxiliary fasteners and devices need not be used when installing the device.

Yet another object of this invention is to provide a protector which will conform to a variety of shoes having different heel contours, yet which presents a well-fitted, attractive appearance on any of the various shoes. However, it is not the object of this invention to provide a single protector which may be used with any shoe. The inventor has determined that approximately three protectors of differing lengths will be needed to protect the various ladies heel sizes.

A further objective of this invention is to provide a protector which in addition to not requiring auxiliary fasteners, will not require a user's foot to be inserted in the shoe in order to secure the protector to the shoe.

Still another objective of this invention is to provide a protector of this type which may be relatively easily and economically constructed from light-weight materials which are readily available in a wide variety of colors and having the ability to provide comfortable and reliable protection for the shoe, yet having such stylish good looks and convenient means of application as to be likely utilized by a driver.

These and other important aims and objectives of the present invention will be further explained or will become apparent from the remaining disclosure.

BRIEF DESCRIPTION OF THE DRAWINGS

Following is a description and explanation of each drawing, wherein:

FIG. 5 is a rear elevational view of the protector of FIG. 1 after a user attaches it to a shoe heel;

FIG. 6 is a rear elevational view of the shoe and protector of FIG. 5 as a user pulls on a flap of the protector so as to create a vertically disposed elastic force along the body of the protector;

FIG. 7 is a side elevational view of the shoe and protector of FIG. 6;

FIG. 8 is a cross sectional view, taken along line 8—8 of FIG. 7, showing the flap of the protector secured against the rear interior wall of a shoe;

FIG. 9 is a front perspective view of a second shoe protector embodying the principles of this invention; and FIG. 10 is a fragmentary side elevational view of the protector of FIG. 9 installed on a shoe, parts of the shoe being broken away to reveal details of the protector's construction and installation.

DESCRIPTION OF THE PREFERRED EMBODIMENT

Figure 1:
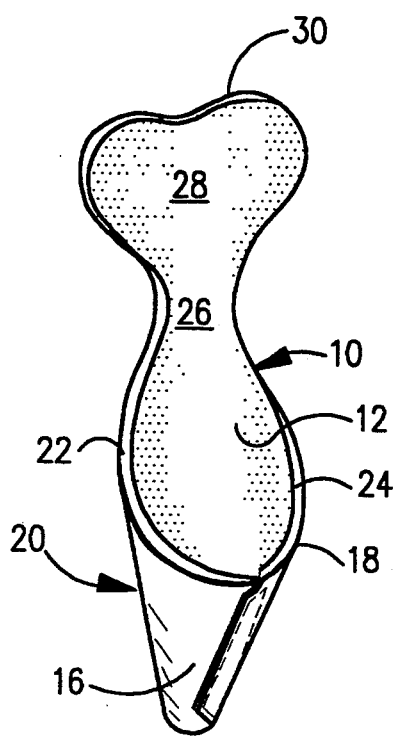
FIG. 1 is a front perspective view of a shoe protector embodying the principles of this invention.
Figure 4:
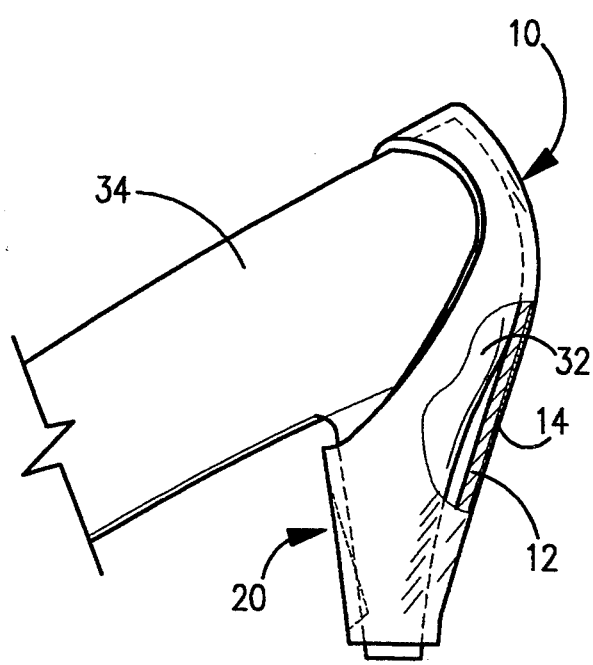
FIG. 4 is a fragmentary, side elevational view of the shoe and protector of FIG. 2, parts of the protector being broken away and shown in cross section to reveal details of construction.

A protector for the heel and back portion of a shoe embodying the principles of this invention is broadly designated in the drawings by the reference numeral 10. See FIG. 1. Protector 10 is preferably constructed from an initially flat, relatively flexible, elongated sheet of material comprising a layer 12 of relatively soft, cellular sponge-like material such as single-cell sponge rubber to which is bonded another layer 14 of a cloth-like material such as a stretch-type nylon fabric (FIG. 4). The layer 12 should be capable of being stretched so as to create an elastic force and should have a relatively high coefficient of friction. Cloth-like materials suitable for layer 14 are commercialized by a number of companies under different registered trademarks such as Spandex, Lycra, and the like. Also, cloth-like material of this type bonded to a layer of sponge rubber is readily available in the commercial world. In the preferred embodiment, the sponge rubber material is 3/32" thick. Other thicknesses might be used, but it is believed that due to its bulkiness, material substantially thicker would be ill-suited for the function outlined below. Conversely, it is believed that material substantially thinner would not be capable of producing enough of an elastic force, also making it ill-suited for the present invention.

A tube adapted for releasably securing a portion of the shoe heel so as to resist upward slipping of the protector relative to the shoe is attached to the lower edge of the initially flat sheet of material composed of layers 12 and 14. In the preferred embodiment, a portion of the initially flat sheet of material is extended to form the tube. The extended portion is cut relatively wide compared to the rest of the protector so as to form a pair of wings 16 and 18 (FIG. 1) which extend substantially horizontally from said protector in opposite directions and which are bent back on one another as shown in the drawing. The sponge rubber layer 12 becomes the interior surface of the tube and is disposed such that it engages and is in direct contact with the heel and back of the shoe. The ends of the respective wings 16 and 18 are secured together, preferably by sewing, but also by adhesive bonding or other means, so as to form said tube 20 at the lowermost portion of protector 10. Tube 20 is preferably open at is lowermost end, with the cross-sectional dimension of the tube increasing as it ascends vertically upward along the shoe heel and back.

The opposite side edges 22 and 24 of the protector are curved as shown in the drawing, gradually diverging as they ascend upward from the top of said tube 20 so that they may accommodate the bulging contour of the shoe back and then gradually converging so as to form a relatively narrow neck 26 where the protector is folded into the interior of a shoe.

Thereafter, edges 22 and 24 again diverge to present a relatively wide flap 28 integral with and disposed upwardly from the neck portion 26 of protector 10. The edges 22 and 24 diverge as they ascend upward from the narrow neck 26. Then they converge, first upwardly and then downwardly, such that they meet to form a generally heart-shaped flap. The width of the flap 28 is somewhat larger than the rear interior wall of the shoe. The dip or notch 30 in the heart-shaped flap is critical for a purpose which will soon become apparent.

Figure 2:
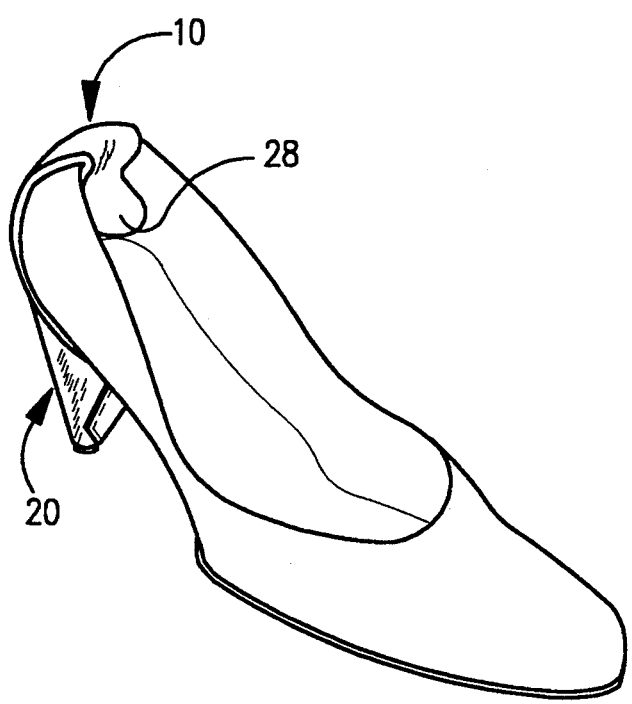
FIG. 2 is a perspective view, on a reduced scale, showing the protector of FIG. 1 installed on a shoe.
Figure 3:
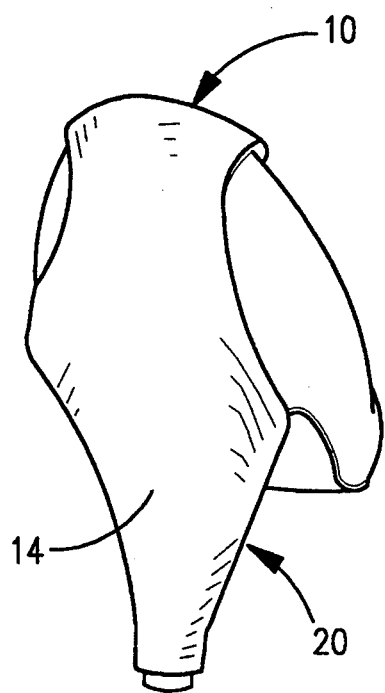
FIG. 3 is a rear elevational view of the shoe and protector of FIG. 2.

In use, tube 20 of cover 10 is slipped over the heel 32 of a shoe 34 as illustrated in the drawings (FIG. 5). The user 38 then pulls upwardly on the flap 28 so as to create an elastic force 36 in the protector 10 which runs vertically along the shoe heel and back (FIGS. 5-7). The flap is then folded into the interior portion of the shoe and pressed firmly against the rear interior wall of the shoe (FIGS. 2 & 8). The flap 28 assumes the contour of the rear inner surface of the shoe and the relief afforded by the contour of the flap edge 30 prevents buckling of the protector 10 in the flap region 28 which can lead to relaxation of the elastic force previously created. Note that the heart-shaped design of the flap 28, including the notch or dip is critical to the function of the protector 10. A flap 28 that is cut straight across instead of being notched will not work. Once the elastic force is relieved, the flap 28 of the protector 10 tends to pull out of the interior portion of the shoe, thus releasing the protector from the shoe and allowing the heel and back of the shoe to be scratched, scuffed or marred. Note that no pressure by the user's foot is needed to keep this particular protector secured to the shoe. The relatively high coefficient of friction of the sponge rubber layer 12 and the elastic force created in the protector 10 serve to secure the protector to the shoe by surface traction (FIG. 3).

The combination of the stretch-type nylon layer 14 bonded to the side of the protector 10 which does not engage the shoe heel and back and the shoe engaging sponge rubber layer 12 serve to create an article which exhibits surprising gripping characteristics on the heel and back portions of a shoe. The strengthening and stiffening properties of the sponge rubber 10 are not so important to the operation of this invention as are the elastic and frictional properties of the layer. The durability of the protector 10 is enhanced by the stretch-type nylon layer 14.

In one version of the invention, a generally heart-shaped piece of thin dense rubber 35 which is slightly smaller in size than the flap 28 of the protector is bonded to the side of the flap which would otherwise frictionally engage the rear inner wall of the shoe. See FIG. 9. The surface of the dense rubber 35 which engages the shoe has a roughened texture so that increased surface traction is created between the flap 28 and the rear inner wall of the shoe (FIG. 10).

Once the wearer places a foot in the shoe, the protector cannot be removed until the foot is removed from the shoe. It has been found that the relatively soft material used in the construction of the cover ensures that flap 28 does not cause discomfort to the wearer.

FIG. 4 illustrates that it is not necessary that the protector be contoured precisely to the exact shape of any particular shoe. In the illustration, the heel 32 of shoe 34 is not as large as the tube 20. Nevertheless, no unsightly wrinkles appear in the cover because of the inherent elasticity of the materials used in its construction. The elasticity of the material from which the protector is fabricated, combined with the contour of the protector, ensures that the cover will adequately accommodate a wide variety of shoes despite the respective contour of any particular shoe. However, a single protector will not work with every shoe. Different sized protectors will be necessary for mens shoes, ladies short heeled shoes, ladies spike heeled shoes, etc.

The stretch nylon material comprising the outer layer 14 of the covers is, of course, available in virtually an unlimited number of colors. A cover closely matching the color of the shoes with which it is to be worn can be chosen if desired. Conversely, a contrasting color might be selected, if desired, to present a pleasing appearance. The construction of the cover with the securement to a shoe through the integral tube and integral flap of the cover ensures that the latter comprises an article of pleasing appearance. Its relative light weight and ease of installation and removal ensures that it can be readily utilized for the purpose intended. The frictional and elastic sponge rubber material not only ensures the secure attachment to the shoe but aids greatly in the protective function performed by the cover. Further, the nylon outer material is highly resistant to wear and abrasion and functions to present a very pleasing outer appearance available in virtually any color, shade, print or design desired.

While the protector depicted in the drawing and described in the specification is shaped to accommodate a typical ladies high heel shoe, the principles of this invention need not be so limited. It will be apparent to these skilled in the art that these principles are equally applicable, for example, to protectors for covering the heels of other types of ladies shoes or mens shoes. All that is necessary is to vary the particular dimensions of the portions of the cover as may be required without departing from the overall teachings of this disclosure.

It should be pointed out that protectors embodying the principles of this invention might well be worn over shoe heels primarily for a decorative, rather than a strictly protective purpose. While such covers inherently furnish protection, the attractive qualities lend themselves to providing a means for enhancing the attractive look of the shoes. It is contemplated that covers constructed pursuant to the principles of this invention may be worn to provide attractive color alternatives for the wearer.

Having described my invention, I claim:

1. A protector for a shoe heel and back comprising:
   an elongated sheet of material comprising relatively soft, single-cell sponge rubber having a thickness of approximately 3/32", capable of being stretched so as to create an elastic force and having a relatively high coefficient of friction, said elongated sheet of material having upper and lower portions, a pair of side edges, a lower edge, an interior surface engaging and in direct contact with the shoe heel and back and an outer surface not engaging the shoe heel and back;
   a layer of stretch-type nylon fabric bonded to said surface not engaging the shoe heel and back, whereby the strength and durability of the protector is increased;
   means attached to said lower edge of said elongated sheet of material for releasably securing said protector to the shoe heel;
   means attached to the lower portion of said elongated sheet of material for protecting the shoe heel and back; and
   a flap created by the upper portion of said elongated sheet of material, whereby said flap may be pulled by a user, after said protector is secured to the shoe heel, so as to stretch said protector and create an elastic force before folding said flap into an inner portion of the shoe and pressing said flap against a rear interior wall of the shoe so as to secure said protector to the shoe using surface traction created by said elastic force and said high coefficient of friction of said elongated sheet of material.

2. A protector for a shoe heel and back comprising:
   an elongated sheet of material capable of being stretched so as to create an elastic force and having a relatively high coefficient of friction, said elongated sheet of material having upper and lower portions, a pair of side edges and a lower edge;
   means attached to said lower edge of said elongated sheet of material for releasably securing said protector to the shoe heel;
   means attached to the lower portion of said elongated sheet of material for protecting the shoe heel and back;
   a flap, created by the upper portion of said elongated sheet of material, comprising a pair of opposite side edges which are coextensive with the side edges of said upper portion of said elongated sheet of material and which begin at a narrow neck between said upper and lower portions of said elongated sheet of material, first diverging as they ascend upward from said lower portion, then converging, first upwardly and then downwardly, such that they meet to form a generally heart-shaped flap, said flap being somewhat larger in width than a rear interior wall portion of the shoe, said downward convergence of said opposite side edges creating a notch which is critical in relieving a horizontal rigidity in said flap which can lead to loss of said surface traction securing said protector to the shoe, whereby said flap may be pulled by a user, after said protector is secured to the shoe heel, so as to stretch said protector and create an elastic force before folding said flap into an inner portion of the shoe and pressing said flap against the rear interior wall portion of the shoe so as to secure said protector to the shoe using surface traction created by said elastic force and said high coefficient of friction of said elongated sheet of material; and
   a generally heart-shaped piece of thin dense rubber which is slightly smaller in size than said flap of said protector, said dense rubber piece being bonded to a side of said flap which would otherwise engage and come in direct contact with the rear inner wall of the shoe, said dense rubber piece having a roughened texture on a side which engages and comes in direct contact with the rear inner wall of the shoe so as to increase said surface traction between said flap and the shoe.

3. A protector for a shoe heel and back consisting of:
   an elongated sheet of relatively soft, cellular sponge-like material, approximately 3/32" thick, capable of being stretched so as to create an elastic force and having a relatively high coefficient of friction, said sheet having an interior surface engaging and in direct contact with the shoe heel and back and an outer surface not engaging the shoe heel and back, said sheet further having upper and lower portions, a pair of side edges and a lower edge;

a layer of cloth-like material bonded to said surface not engaging the shoe heel and back, whereby the strength and durability of the protector is increased;

a tube attached to said lower edge of said sheet for releasably receiving a portion of the shoe heel, whereby said protector is secured to the shoe heel and resists upward slipping of the protector relative to the shoe;

means attached to the lower portion of said elongated sheet for protecting the shoe heel and back, said means comprising a pair of opposite side edges which are coextensive with said side edges of said lower portion of said elongated sheet and which gradually diverge as they ascend upward from the top of said tube so that they may accommodate the bulging contour of the shoe back and which then gradually converge to form a narrow neck between said lower and upper portions of said sheet;

a flap created by the upper portion of said elongated sheet, whereby said flap may be pulled by a user, after said protector is secured to the shoe heel, so as to stretch said protector and create an elastic force before folding said flap into an inner portion of the shoe and pressing said flap against a rear interior wall of the shoe so as to secure said protector to the shoe using surface traction created by said elastic force and said high coefficient of friction of said elongated sheet of material, wherein said flap comprises a pair of opposite side edges which are coextensive with the side edges of said upper portion of said elongated sheet of material and which begin at a narrow neck between said upper and lower portions of said elongated sheet of material, first diverging as they ascend upward from said lower portion, then converging, first upwardly and then downwardly, such that they meet to form a generally heart-shaped flap, said flap being somewhat larger in width than a rear interior wall portion of the shoe, said downward convergence of said opposite side edges creating a notch which is critical in relieving a horizontal rigidity in said flap which can lead to loss of said surface traction securing said protector to the shoe.

* * * * *